Jan. 17, 1928.  
A. ANDERSON  
ARTIFICIAL TREE  
Filed March 5, 1927
1,656,310
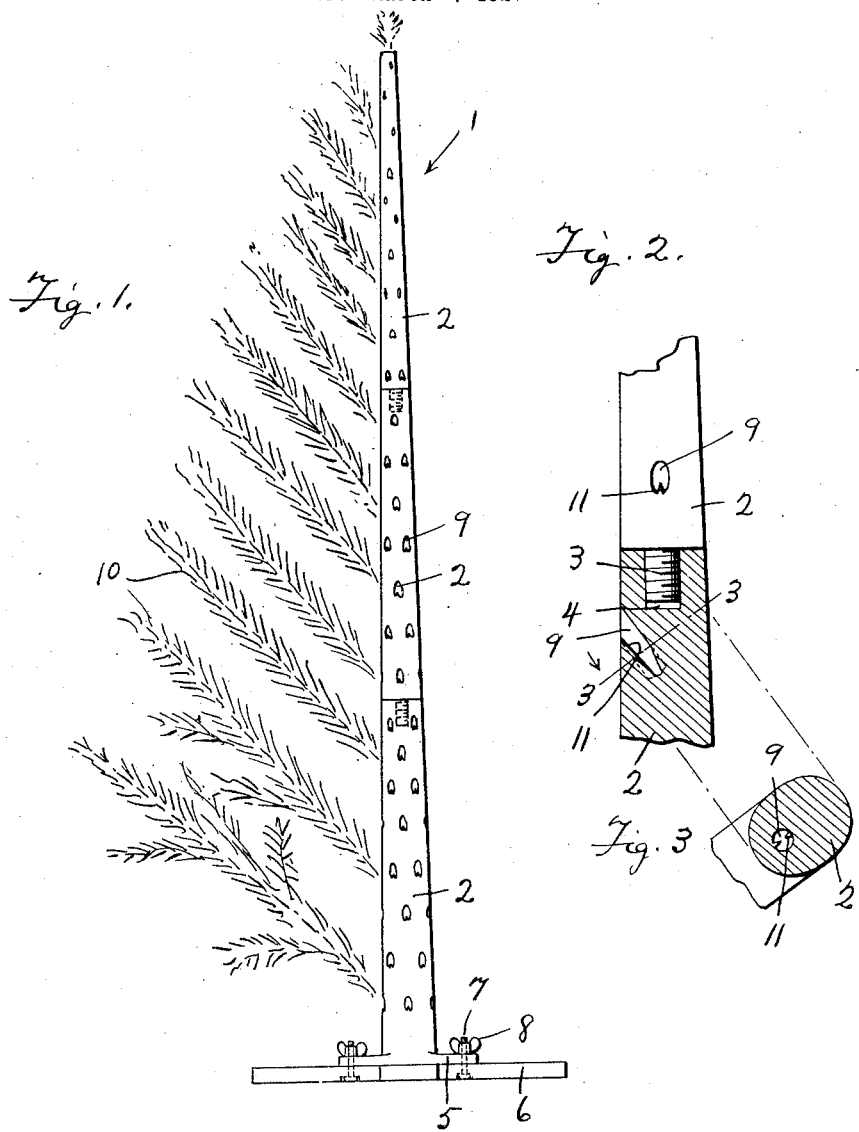
Inventor  
August Anderson.
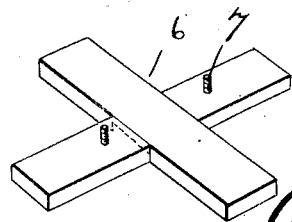
By Clarence A O'Brien  
Attorney Patented Jan. 17, 1928.

1,656,310

UNITED STATES PATENT OFFICE.

AUGUST ANDERSON, OF DENVER, COLORADO.

ARTIFICIAL TREE.

Application filed March 5, 1927. Serial No. 173,077.

The present invention relates to improvements in artificial trees, and has for its principal object to provide a means whereby the trimmed ends of the branches of a natural tree may be utilized for the purpose of forming the branches of the artificial tree.

One of the important objects of the present invention is to provide an artificial tree of the above mentioned character, wherein the trunk of the tree is formed with a series of downwardly inclined pockets for receiving the inner ends of the branches, means being arranged within the pocket for receiving the branches therein against accidental displacement and rotation.

A further object is to provide an artificial tree which includes a trunk formed of a series of interconnected sections, which may be readily and easily attached or detached, the lowermost section being formed with attaching flanges for securing the same to a suitable base.

A further object is to provide an artificial tree of the above mentioned character, which is simple in construction and otherwise well adapted for the purpose for which it is designed.

Other objects and advantages of the invention will become apparent during the course of the following detailed description.

In the accompanying drawing forming a part of this application, and in which like reference characters designate like parts throughout the views:

Figure 1 is a side elevation of the artificial tree embodying my invention.

Figure 2 is a fragmentry detail, showing the connecting means between the adjacent ends of the sections of the tree trunk, one of the pockets for receiving the inner ends of the branches being shown.

Figure 3 is a sectional view, taken approximately on the line 2—2 of Figure 3, showing the securing means in the pockets for the branches, and Figure 4 is a detail perspective view of the base.

In the drawing, wherein for the purpose of illustration is shown the preferred embodiment of my invention, the numeral 1 designates generally my improved artificial tree, the same comprising a series of solid sections designated by the numeral 2, and these sections gradually taper toward their upper ends in the manner shown in Figure 1. The sections are adapted to be detachably secured together in superposed relation, through the medium of a threaded shank 3, which depends from the lower end of the upper sections, the next lower section being formed with a threaded socket 4 for receiving the threaded shank, as is clearly shown in Figure 2. In this manner, the sections, when properly assembled, will form a vertical tree simulating trunk, which tapers gradually toward its upper end. As many sections may be provided, as is desired, depending upon the height desired. The lowermost section is formed with laterally extending ears 5, to permit the trunk to be secured on a suitable base 6, and in the present instance this base is shown in Figure 4 as being of crucifix formation, although it is to be understood that I do not wish to limit myself to any particular shape of the base.

The base rests on the floor and extending upwardly therefrom are the threaded bolts 7, the same being adapted to extend through any suitable apertures provided therefor in the laterally extending ears 5, and suitable thumb nuts 8 are threaded on the upper threaded ends of the bolts and engage the upper face of the respective ears in the manner as clearly shown in Figure 1, whereby the trunks will be rigidly supported in a vertical position.

Each of the solid trunk forming sections 2 is formed with a series of spaced pockets 9 which are inclined downwardly in a manner as also shown in Figure 2, and these pockets are of a suitable depth for receiving and holding the inner ends of the branches 10.

The branches are obtained by trimming the ends of the branches of a natural tree and these branches 10 may be of any desired length, it being understood, of course, that the length of the branches gradually decrease from the bottom of the tree trunk to the upper end thereof as is clearly shown in Figure 1, thus giving the simulation of a natural tree.

For the purpose of securing the inner ends of the branches in their respective pockets so that the same will not become accidentally disengaged therefrom, and to further prevent any possibility of the inner ends of the branches rotating, there is formed in each pocket a pair of diametrically opposed teeth forming ribs 11, the upper edges thereof being sharpened and adapted to bite into the stem of the branch. The branch securing means is more clearly shown in Figure 3.

By utilizing the trimmed ends of the branches of a natural tree, considerable expense will be saved in providing a decorative tree and the simplicity with which my device is constructed, enables the parts to be readily assembled or disassembled, and when disassembled the tree forming trunk sections may be stored away in a compact manner, without occupying any considerable amount of space.

While I have shown the preferred embodiment of my invention, it is to be understood that various changes in the size, shape and arrangement of parts may be resorted to, without departing from the spirit of the invention or the scope of the appended claims.

What I claim is:

1. An artificial tree comprising a base, a trunk extending upwardly from the base, said trunk being formed with a series of spaced downwardly inclined pockets for receiving the trimmed ends of the branches of a natural tree, means for retaining the inner ends of the branches in the respective pockets, said means comprising teeth forming ribs formed in the pocket, and adapted to bite into the stem of the branches.

2. An artificial tree comprising a base, a trunk comprising a plurality of solid sections, means for detachably securing the sections together in superposed relation, means associated with the lowermost section for securing the same on the base, each section being formed with a plurality of spaced downwardly inclined pockets for receiving the trimmed ends of the branches of a natural tree, and teeth forming ribs in each pocket for biting engagement with the stem of the respective branch for securing the same in the pocket against accidental displacement therefrom.

In testimony whereof I affix my signature.

AUGUST ANDERSON.